June 29, 1971 R. DIJKSTRA 3,589,907

PHOTOSENSITIVE LACQUER AND THE USE OF THIS LACQUER IN MANUFACTURING PICTURE SCREENS FOR CATHODE-RAY TUBES

Filed March 2, 1967

INVENTOR.
RINSE DIJKSTRA

BY Frank R. Trifari
AGENT 3,589,907

PHOTOSENSITIVE LACQUER AND THE USE OF THIS LACQUER IN MANUFACTURING PICTURE SCREENS FOR CATHODE-RAY TUBES

Rinse Dijkstra, Emmasingel, Eindhoven, Netherlands, assignor to U.S. Philips Corporation, New York, N.Y.

Filed Mar. 2, 1967, Ser. No. 620,029
Claims priority, application Netherlands, Mar. 4, 1966, 6602796
Int. Cl. G03c *1/66*
U.S. Cl. 96—93 4 Claims

ABSTRACT OF THE DISCLOSURE

Use of dipolar aprotic substances to increase photosensitivity of aqueous polyvinyl alcohol bichromate lacquers. Examples of the aprotic substances are ethylene carbonate and dimethyl acetamide. The lacquers are particularly useful in the attachment of colored phosphors to cathode-ray tubes for color television sets.

Figure 1:
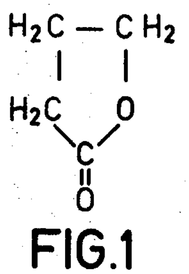
Figure 2:
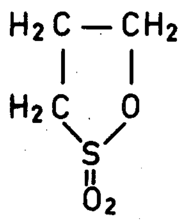
Figure 3:
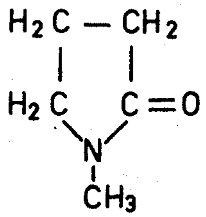
Figure 4:
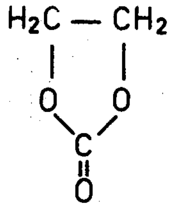
Figure 5:
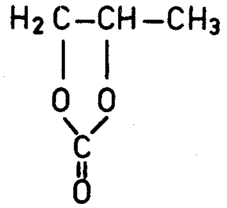
Figure 6:
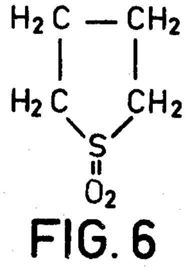
Figure 7:
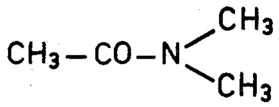
Figure 8:
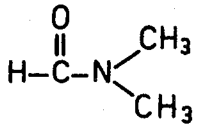
Figure 9:
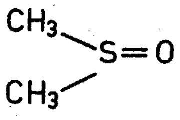

The invention relates to a photosensitive lacquer which contains as the photosensitive system an aqueous solution of polyvinyl alcohol and a bichromate compound to a method of preparing such a lacquer, to a particular use of said lacquer namely in manufacturing picture screens for cathode-ray tubes, for example, for reproducing colour pictures, and to cathode ray tubes comprising picture screens manufactured with the use of said lacquer.

Photosensitive lacquers are used for providing patterns photomechanically. For this purpose the surface of the article which is to be provided with a pattern is coated with a thin layer of the photosensitive lacquer. The layer of the lacquer is then irradiated according to the desired pattern with actinic rays while using an illumination jig which is arranged between the lacquer layer and the light source. In the case of a lacquer on the basis of polyvinyl alcohol, said lacquer becomes insoluble in water during the exposure to light, the non-exposed parts of the lacquer layer being soluble in water. During the so-called development the unexposed parts of the lacquer layer are washed away. The surface of the article which is now partly covered with a layer of lacquer according to the desired pattern, may then be further treated, for example, etched, if desired.

Photomechanical methods are used inter alia in the manufacture of printing plates, in providing decorative or other patterns in which pigments are distributed in the layer of lacquer or are provided thereon, in manufacturing printed wiring, in manufacturing picture screens for cathode-ray tubes, in manufacturing masks for exposing, according to a given pattern, photosensitive or luminescent layers, for example, in certain types of cathode-ray tubes.

During the exposure to actinic light of the layer of lacquer a reaction taken place in which the hexavalent chromium in the bichromate compound is reduced to, as is assumed, trivalent chromium. The reaction products formed cause the lacquer layer to become insoluble. The rate at which the lacquer layer becomes insoluble is dependent inter alia upon the water content of the lacquer layer after drying. This rate is larger according as the water content of the lacquer layer is smaller.

In addition to this photochemical reaction another reaction takes place prior to exposure of the lacquer layer to light. This is the so-called "dark reaction" in which there is a tendency of the lacquer layer to become insoluble during the act of drying in the absence of light. This tendency increases with the increase in the average chain length of the polyvinyl alcohol. As a result of this "dark reaction" fogging occurs and it is difficult to produce a faithful and well-defined image of the pattern.

The rate at which the lacquer becomes insoluble in water as a result of exposure to actinic light also depends inter alia upon the average chain length of the polyvinyl alcohol molecules. The reaction velocity increases with increasing average chain length.

It is an object of the invention to reduce, by suitable measures, the exposure time which is necessary to obtain a faithful image of the pattern which readily adheres to the substrate without also accelerating the dark reaction.

Another object of the invention is to enable the use of polyvinyl alcohol having a larger average chain length than was practically possible so far by increasing the rate of the light reaction together with a relative decrease of the dark reaction. This permits an additional reduction of the exposure time.

It is a further object of the invention, to accelerate the manufacture of picture screens for cathode-ray tubes by the use of "faster" photosensitive lacquers.

It has been found that the photosensitivity of a lacquer which consists of an aqueous solution of polyvinyl alcohol and a bichromate compound, to which a dipolar aprotic substance has been added, is larger than that of a corresponding lacquer without this addition.

A dipolar aprotic substance is to be understood to mean herein a compound which comprises a dipole and which is not capable of splitting off protons or forming hydrogen bridges with other nucleophilic substances.

Examples of dipolar aprotic substances are:

Alkylated amides such as dimethylformamide B.P. 153° C., dimethylacetamide B.P. 166° C., N,N-dimethylpropionamide B.P. 175° C., N,N,-dimethylacrylamide B.P. (21 mm.) 83° C., N,N-dimethyltrichloroacetamide B.P. 186° C., diethyl formamide B.P. 178° C., methylethyl formamide B.P. 180° C., diethylacetamide B.P. 186° C., methyl - ethylacetamide, N,N - diethylpropionamide B.P. 191° C., methyldiacetylamine B.P. 190° C., tetramethylurea B.P. 176.5° C., dimethylthioformamide B.P. 227° C.

Alkylated urethanes such as N,N - dimethylmethylurethane B.P. 131° C., N,N dimethylmethylurethane B.P. 140° C.

Alkylated sulfonamides such as N,N-dimethylmethane sulfonamide B.P. (8 mm.) 103° C., N,N-dimethylethane sulfonamide B.P. 240° C., N,N-diethylethane sulfonamide B.P. 254° C.

Alkylated phosphoramides such as hexamethylphosamide B.P. exceeding 300° C.

Sulfoxides and sulfones such as dimethylsulfoxide B.P. 189° C., methylethylsulfoxide, diethylsulfoxide, dimethylsulfone, propanesultone B.P. (10 mm.) 150° C.

Nitriles such as acetonitrile B.P. 82° C., succinonitrile B.P. 267° C.

Alkylated 2-pyrrolidones such as N-methyl-2-pyrrolidone B.P. 204° C., N-ethyl-2-pyrrolidone B.P. 218° C., N-ethyl-5-methyl-2-pyrrolidone B.P. 225° C., N-methyl-5-methyl-2-pyrrolidone B.P. 217° C.

Butyrolacetones such as λ-butyrolacetone B.P. 206° C., 5-methylbutyrolacetone B.P. 206° C., 3-methylbutyrolacetone B.P. 202° C.

Cyclic carbonic acid esters such as ethylene carbonate B.P. 244° C., propylene carbonate B.P. 242° C.

Ethers and ketones such as tetrahydrofurane B.P. 66° C., acetone B.P. 56° C., N,N-dimethyl cyananide B.P. 164° C., sulpholane B.P. 280° C., 2-4-dimethyl sulpholane B.P. 276° C., 3-methylsulpholane B.P. 276° C.

The above-mentioned dipolar, aprotic compounds are all miscible with water or may be dissolved therein.

It has been found that the presence of such a substance in the photosensitive lacquer does not increase the rate of the dark reaction which in certain cases is even smaller than in a corresponding lacquer without this addition.

It is found in practice, however, that not every dipolar aprotic substance is equally useful for the end in view.

Although some dipolar aprotic substances increase the photosensitivity of the lacquer system, they react with the bichromate compound, for example, dimethyl sulphoxide. Therefore the end in view is not reached with this substance. In connection herewith the requirement must consequently be imposed that the dipolar aprotic substance itself is not oxidized or is substantially not oxidized by the bichromate compound.

In order to obtain a homogeneous lacquer layer it is furthermore necessary that the dipolar aprotic substance should be readily soluble in water or miscible with water at room temperature. It is also necessary that during drying of the lacquer layer the dipolar aprotic substance should evaporate less rapidly than water so that its boiling point should be at any rate above that of water.

Therefore the photosensitive lacquer according to the invention, which contains as the photosensitive system an aqueous solution of polyvinyl alcohol and a bichromate compound is characterized in that the solvent consists of a mixture of water and a dipolar aprotic substance which does not react or does substantially not react with the bichromate compound, is readily soluble in water or miscible with water at room temperature and has a boiling point above that of water.

According to the invention, when using such a lacquer the exposure time may generally be halved as compared with a lacquer without an addition.

Some dipolar aprotic substances which fulfil this characteristic feature react with water under hydrolysis, for example, propane sultone and, to a slight extent, also $\gamma$-butyrolaction and dimethyl formamide. Although photosensitive lacquers with increased photosensitivity can be obtained with these substances, these aqueous lacquers are unstable and must be processed soon after the preparation. In fact, during hydrolysis protonic compounds are formed which produce a reduction of the pH of the lacquer and consequently promote the dark reaction. During the hydrolysis, oxidizable substances may also be formed which react with the bichromate compound. In addition, dimethyl formamide is particularly hygroscopic.

Therefore dipolar aprotic substances are preferably used which do not react or do substantially not react with water at room temperature, for example, N-methyl-2-pyrrolidone, ethylene carbonate, propylene carbonate, tetrahydrothiophene-1-1-dioxide (sulpholane), dimethyl acetamide.

The method according to the invention of preparing photosensitive lacquers containing as a photosensitive system an aqueous solution of polyvinyl alcohol and a bichromate compound is characterized in that a lacquer is prepared the solvent of which is a mixture of water and a dipolar aprotic substance which does not react or does substantially not react with the bichromate compound, is readily soluble in water or is miscible with water at room temperature and has a boiling point above that of water.

The dipolar aprotic substances which, according to the invention, are used to increase the photosensitivity of photosensitive lacquers are distinguished from substances which, when added to photosensitive lacquers, also increase the photosensitivity, for example, ethylene glycol, particularly in that the increase of the photosensitivity is not associated with an acceleration of the dark reaction.

Of course, several dipolar aprotic substances may simultaneously be present in the lacquer.

Acetone, acetonitrile and nitrobenzene which are usually classed among the dipolar aprotic substances cannot be used in the photosensitive lacquers according to the invention; acetone and acetonitrile having a boiling point below that of water, and nitrobenzene being poorly water-soluble.

It can be proved in a simple manner whether a certain dipolar aprotic substance is oxidized by a bichromate compound. For this purpose one part by volume of 25% by weight of ammonium bichromate solution in water, one part by volume of water and one part by volume of the dipolar aprotic substance to be investigated are mixed while excluding actinic rays. If oxidation takes place a change in colour from orange to brown may be observed after a few hours. The experiment is carried out at a temperature of 20° C.

In the case of, for example, ethylene carbonate and sulpholane no change in colour can be found in these circumstances after 24 hours, N-methyl pyrrolidone produces hardly any colour variation. In the case of dimethyl sulphoxide the solution has turned brown after a few hours and in the case of ethylene glycol such a change in colour takes place already after a few minutes.

In the table below a few data are given regarding dipolar aprotic substances and their properties which may be of importance within the scope of this invention.

The number in the first column corresponds to the number of the figure on the formula sheet, the second column states the name of the dipolar aprotic substance in question, the third column gives the boiling points and the fourth column states the quantities to be used to obtain an optimum effect in percent by weight related to the quantity of polyvinyl alcohol which is present in the lacquer. The fifth column, finally, states a few general data.

TABLE I

| Number | Name | Boiling point in ° C | Quantity to be used in percent by weight | Remarks |
|---|---|---|---|---|
| 1 | $\gamma$-butyrolacton | 206 | 25–30 | Slight hydrolysis. |
| 2 | Propane sultone | 150 (10 mm. Hg) | | Hydrolysis. |
| 3 | N-methyl-2-pyrrolidone | 205 | 20–25 | |
| 4 | Ethylene carbonate | 245 | 15–20 | |
| 5 | Propylene carbonate | | | |
| 6 | Sulpholane | 290 | ca. 15 | |
| 7 | Dimethyl acetamide | 165.5 | 30 | |
| 8 | Dimethyl formamide | 153 | | Slight hydrolysis. |
| 9 | Dimethyl sulphoxide | 189 | | Is oxidized by the bichromate compound. |

The photosensitive lacquers according to the invention contain the polyvinyl alcohols commonly used in photosensitive lacquers, that is to say, the water-soluble alcohols having an average molecular weight between 50,000–70,000 which, in a solution in water of 4 gms. per 100 mls., have a viscosity between 21 and 22 centipoises. An example 52–22 (for 88% hydrolised polyvinyl acetate of Du Pont de Nemours). It has been found, however, that the polyvinyl alcohols with higher molecular weights (larger average chain lengths) which are more photosensitive but less useful as a result of too fast a dark reaction, do give good results when using dipolar aprotic substances according to the invention because apparently the dark reaction is suppressed. The use of these highly molecular polyvinyl alcohols permits of obtaining an additional increase of the photosensivity. Examples of these polyviny alcohols are:

Elvanol 50–42, MW=89,000 (Du Pont de Nemours)
Vinavilol 42–88 MW=96,000 (Montecatini)

Both types consist of polyvinyl acetate having a degree of hydrolysis of 88%.

A photosensitive lacquer which is useful in the scope of this invention has the following composition:

5 gms. of polyvinyl alcohol (Elvanol 52–22)
0.5 gm. $(NH_4)_2Cr_2O_7$
95 gms. $H_2O$
0.75–2 gms. of a dipolar, aprotic substance as defined above.

The quantity of dipolar aprotic substance usually is pigments.

The quantity of dipolar aprotic substance usually is from 10 to 40% by weight calculated on the weight of the polyvinyl alcohol and preferably from 15 to 30% by weight.

Below 15% the effect aimed at becomes smaller and poorly reproducible, above 30% sticky lacquer layers are usually ofrmed although, for example, useful lacquer layers are obtained with ethylene carbonate to 50% by weight. In general a lower content of the dipolar aprotic substance is sufficient according as its volatility is smaller.

EXAMPLE 1

Glass plates which were previously degreased in a mixture of bichromate and sulphuric acid and were then rinsed and coated with the following lacquer compositions.

Result with a normal lacquer

Composition of a lacquer:
5 gms. of polyvinyl alcohol (Elvanol 52–22)
0.59 gm. of $(NH_4)_2Cr_2O_7$
95 gms. of water.

The thickness of the lacquer layer after drying in air of a relative humidity of 50% is 0.011 mm.

Image after:
¼ min.: no dots.
½ min.: a few dots.
1 min.: dots present but deformed and displaced.
2 min.: as 1 min., less disorder.
4 min.: correct or substantially correct image.

Dark reaction after 4 min.: at unexposed places a non-visible organic skin (to be established by means of a scratch test).

Results with lacquers which contain a dipolar aprotic substance

Lacquers obtained by adding to the above lacquers per 5 gms. of polyvinyl alcohol:

1.5 gms. of dimethyl acetamide
1.25–1.5 gms. of λ-butyrolactone
1.00–1.25 gms. of N-methyl pyrrolidone
0.75–1.00 gm. of ethylene carbonate
0.75 gm. of sulpholane show on an average the image as stated below for 0.75 gm. of ethylene carbonate in addition with a lacquer layer having a thickness of 0.011 mm.

Image after:
¼ min.: dots already present
½ min.: all dots present
1 min.: substantially correct image
2 min.: correct image
4 min.: correct image Dark reaction after 4 min.: at unexposed part no lacquer residues.

When using a polyvinyl alcohol having a higher molecular weight Vinavilol 42–88) the result was as follows using a lacquer layer having a thickness of 0.011 mm. (see Table II).

TABLE II

| | Normal lacquer composition | With 15% by weight of ethylene carbonate |
|---|---|---|
| Image after: | | |
| ¼ min | A few dots | Substantially all the dots present. |
| ½ min | All dots, disorder | |
| 1 min | All dots, less disorder | Correct image. |
| 2 min | Correct image | Do. |
| 4 min | do | Do. |
| Dark reaction | Very much skin formation at unexposed places so that the "correct" images again have the tendency to deform. | No or hardly any organic residues at unexposed places. |

According to another aspect of the invention the new photosensitive lacquers may particularly advantageously be used in the manufacture of picture screens for cathode-ray tubes, for example, for reproducing colour pictures, a luminescent layer being provided on the screen by means of a photosensitive lacquer. In cathode-ray tubes for reproducing colour images at least two substances which, on excitation by electrons, luminesce in different colours and, if desired, a substance which does not luminesce in visible light and does not transmit light, are provided on the screen according to a given pattern. The pattern may consist of dots or strips in accordance with the type of the cathode-ray tube.

The manufacture of the pattern is carried out in a number of steps in which the various luminescent substances are successively provided.

Providing the substances themselves may be effected in different manners.

(a) The luminescent substance to be provided is suspended in the photosensitive lacquer. The suspension is provided on the screen and dried. The lacquer layer is then exposed at those places where a dot, strip or differently formed part of the surface of the screen has to be coated with the luminescent substance in question. The exposed parts of the lacquer layer become insoluble in certain solvents. These solvents need not be the same as the solvent with which the photosensitive lacquer was prepared. The binder and the luminescent substance are then removed from the unexposed places by washing with a solvent. After these operations the screen is covered with a layer of a luminescent substance according to a given pattern.

In this manner various luminescent substances may be successively provided on the screen until the desired picture screen is obtained.

(b) It is impossible or undesired to suspend certain luminescent substances in the photosensitive lacquer. This may have different reasons. Some luminescent substances are attacked by bichromate compounds. When these substances are present in the lacquer the sensitivity of the lacquer rapidly decreases while the composition of the luminescent substance may be varied by oxidation so that the luminescent properties are wholly or partly lost. It is alternatively possible that the luminescent substance absorbs so much of the radiation required for rendering the photosensitive lacquer insoluble that no or an insufficient reaction which must result in the desired insolubility of the lacquer layer takes place within a reasonable time.

In these cases the screen is coated with a layer of the photosensitive lacquer which is exposed according to the desired pattern and made insoluble. In this case the photosensitive lacquer contains no luminescent substance. If the radiation is not continued for too long a period of time the insoluble parts of the lacquer layer may be made somewhat sticky by wetting with a solvent.

For providing the luminescent substance two methods may be used:

According to one method, the unexposed parts of the lacquer layer are washed away in which it is possible that the exposed parts swell and become sticky to some extent. Then a suspension of the substance to be provided in a suitable solvent is spread over the screen. On the sticky lacquer pattern grains of the substances to be provided will adhere. The substance is removed everywhere else by washing with a suitable liquid.

According to another method a suspension of the substance to be provided in some suitable medium or other which makes the exposed parts of the lacquer layer somewhat sticky are spread over the lacquer layer immediately after exposure, after which the medium is evaporated. By washing with a solvent for the unexposed lacquer, the unexposed lacquer layer is removed together with the grains of the substance to be provided which are located on said unexposed layer. The grains of the substance to be provided remain adhering to the exposed and sticky parts of the lacquer layer.

If the layer of grains obtained in this manner is not dense enough the whole operation may be repeated.

It has now been found to be of advantage in providing luminescent substances on screens of cathode-ray tubes, in particular for reproducing colour pictures, to use a photosensitive lacquer which contains as the photosensitive system a polyvinyl alcohol and a bichromate compound and a mixture of water and a dipolar aprotic substance which has a boiling point exceeding that of water, does not react or does substantially not react with the bichromate compound also present in the lacquer and is readily soluble in water or miscible with water at room temperature.

In the described manufacture of picture screens, comparatively large rectangular surfaces are to be coated with a thin, evenly thick layer having a constant low water content throughout the surface of the photosensitive lacquer. This presents particular problems in drying the lacquer layer. Drying of the lacquer layer must be effected throughout the lacquer-coated surface at the same rate and to the same degree. The humidity degree to be reached in the lacquer layers consisting of lacquers which only contain water as the solvent, strongly depends upon the temperature and the relative humidity of the atmosphere. Already small differences in the humidity or temperature may result in large differences in the water content to be reached. The humidity and the temperature in the room where said method is carried out must therefore be accurately controlled while sudden changes of these magnitudes must be prevented.

During providing photosensitive lacquer layers several times in succession in which luminescent substances or no luminescent substances are present, it is desirable to have a number of photosensitive lacquers with various viscosities and flow properties available. This can most simply be reached by using different polyvinyl alcohol concentrations. In photosensitive lacquers which employ exclusively water as a solvent it is found that when the concentration of the polyvinyl alcohol is reduced, a proportional reduction of the bichromate concentration is sufficient, the rate of the dark reaction increases in that case. If the concentration of bichromate is reduced more than proportional, the photosensitivity of the lacquer decreases. This is also the case when ethylene glycol is present in the lacquer.

In using lacquers according to the invention the following was found: when the new photosensitive lacquers according to the invention are used the rate of the light reaction is less dependent upon variation in the water content of the photosensitive lacquer layer, and consequently less dependent on the temperature and the humidity of the room in which the method is carried out and the method of drying.

In addition it was found that, when the concentration of the polyvinyl alcohol is reduced, the bichromate concentration can be reduced proportionally without the rate of the dark reaction increasing. In practice this means that a photosensitive lacquer can be diluted at will until the desired viscosity is achieved.

Another advantage is that by the use of bipolar aprotic substances, a possible decrease of the photosensitivity of the lacquer by reaction of the bichromate compound with the luminescent substances suspended in the lacquer can be mitigated.

The method according to the invention of manufacturing picture screens of cathode-ray tubes will now be described in greater detail with reference to the following specific example.

EXAMPLE 2

Manufacture of a picture screen of a cathode-ray tube employing a shadow mask for reproducing colour pictures A suspension was prepared of a luminescent substance having the following composition:

1200 mls. of water
60 gms. of polyvinyl alcohol (a hydrolised polyvinyl acetate, degree of hydrolysis 88%, means MW approximately 70,000)
10 gms. of ammonium bichromate
10 mls. of N-methyl pyrrolidone
375 gms. of a commonly used luminescent substance.

The suspension furthermore contained a little of an antifoaming agent. For providing a pattern of dots on the screen of a 25-inch cathode-ray tube, 150 mls. of this suspension are poured into the screen which consists of a trough-like piece of glass having a bottom area of approximately 2000 sq. cm. The screen is rotated, tilted and the excess of the suspension is poured out. After drying the lacquer layer by irradiation with infrared lamps, the lacquer layer is exposed according to a pattern of dots by means of the shadow mask which is temporarily mounted in front of the screen. For this purpose a UV-lamp is used. The thickness of the lacquer layer is approximately 15 to 20 microns. During exposure the light source, a high-pressure mercury vapour discharge lamp, is arranged in the deflection point of the electron beam with respect to the combination of the shadow mask screen with lacquer, which beam is to excite dots to be provided in the finished cathode-ray tube.

In this manner a correct positioning of the pattern of dots to be provided with respect to the shadow mask and the corresponding electron gun of the cathode ray tube to be manufactured is ensured.

After exposure the shadow mask is removed and the latent image is developed with water. The unexposed parts of the lacquer layer are rinsed away, the desired pattern of dots appear. The pattern is then dried.

In this manner three patterns of dots of red, green and blue luminescent substances, respectively, are successively provided, the illumination source always being arranged in the relative deflection point and the same shadow mask being used. After providing the pattern of dots, the screen is coated in known manner with a thin metal layer, for example, of aluminium. The binder is then fired out and the shadow mask mounted. The assembly is secured to the cone of a cathode ray tube, after which the electron guns are sealed in the neck of the cone and the assembly is evacuated.

If the lacquer suspension contains no N-methyl pyrrolidone, the required exposure time is 18 minutes. With the lacquer described in this example, said exposure time is then reduced approximately by a factor 2.3, namely 8 minutes.

If instead of 10 mls. of N-methyl pyrrolidone 12 mls. of ethylene carbonate are added to the lacquer, the exposure time is smaller by a factor 2.6, namely 7 minutes.

If 15 mls. of ethylene glycol are added to the lacquer instead of a dipolar aprotic substance, the bichromate concentration must be halved in connection with the acceleration of the dark reaction occuring, as a result of which the exposure time is reduced by only a factor 1.8, namely 10 minutes.

In connection with the fact that when adding a dipolar aprotic substance the dark reaction is suppressed, the polyvinyl alcohol which has a mean molecular weight of approximately 70,000 may be replaced in the above description by a polyvinyl alcohol having a mean molecule weight of approximately 90,000 without undue fogging as a result of the dark reaction being experienced. The required exposure time may then be reduced by approximately 30% to 5.5 minutes in the example employing N-methyl pyrrolidone, or to 5 minutes in the presence of ethylene carbonate.

The addition of dipolar aprotic substances has no adverse influence on the brightness of the luminescent substances.

The shadow mask also used in this method and consisting of a metal plate provided with holes by etching, which forms an essential part of the so-called shadow mask tube described in this example, can be manufactured photomechanically in a suitable manner by means of the lacquer according to the invention.

It is apparent that, in addition to other advantages, the use of the lacquers according to the invention results in a considerable time-saving in manufacturing cathode-ray tubes.

What is claimed is:

1. A photosensitive lacquer comprising a solution of a water soluble polyvinyl alcohol, a light sensitive water soluble bichromate compound and a solvent consisting essentially of water and about 10 to 40% by weight based on the weight of the polyvinyl alcohol of a water soluble or miscible dipolar aprotic compound, said aprotic compound having a boiling point greater than that of water, being sufficiently inert in water so that hydrolysis does not take place and being substantially inert to oxidation by the bichromate compound.

2. A photosensitive lacquer adapted to the application of phosphors to the screens of cathode ray tubes said lacquer comprising a mixture of a phosphor material and the solution of the water soluble polyvinyl alcohol, the light sensitive bichromate compound and the solvent of claim 1.

3. The photosensitive lacquer of claim 1 wherein about 15% to 30% by weight of the aprotic substance based on the weight of the polyvinyl alcohol is employed.

4. The photosensitive lacquer of claim 1 wherein the aprotic substance is selected from the group consisting of the cyclic ethylene ester of carbonic acid, the propylene ester of carbonic acid N-methyl pyrrolidinone, dimethylacetamide and sulfolane.

References Cited

UNITED STATES PATENTS

| | | | |
|---|---|---|---|
| 3,309,202 | 3/1967 | Silver | 96—93X |
| 3,471,294 | 10/1969 | Vander Sanden et al. | 96—93 |
| 2,522,771 | 9/1950 | Barnes et al. | 96—93X |
| 2,624,673 | 1/1953 | Frost et al. | 96—93X |
| 2,742,358 | 4/1956 | Brown | 96—93 |
| 2,897,089 | 7/1959 | Ahlburg | 96—36.1UX |
| 3,198,634 | 8/1965 | Payne | 96—36.1 |
| 3,265,527 | 8/1966 | Adelman | 96—93X |
| 3,140,176 | 7/1964 | Hoffman | 96—36.1 |
| 3,317,319 | 5/1967 | Mayaud | 96—36.1 |
| 3,342,594 | 9/1967 | Kaplan | 96—36.1 |
| 3,380,826 | 4/1968 | Deavy et al. | 96—36.1 |

FOREIGN PATENTS

| | | | |
|---|---|---|---|
| 1,058,690 | 2/1967 | Great Britain | 96—93 |
| 6500153 | 7/1965 | Netherlands | 96—93 |

OTHER REFERENCES

Davis, M. M., "Acid-Base Behavior in Aprotic Organic Solvents," August 1968; pp. 1, 6 and 7 relied on.

Jorgensen et al., "The Sensitivity of Bichromated Colloids," Photo Eng., vol. 7, No. 1, 1956; pp. 12–22 relied on.

Kosar, J., "Light Sensitive Systems," 1965; pp. 66, 67 and 91–94 relied on.

Hackh's Chemical Dictionary, 3rd Ed., 1944; p. 70 relied on.

NORMAN G. TORCHIN, Primary Examiner

C. L. BOWERS, Jr., Assistant Examiner

U.S. Cl. X.R.

96—36.1; 117—33.5